US012197496B1

(12) United States Patent
Chakrabarty et al.

(10) Patent No.: US 12,197,496 B1
(45) Date of Patent: Jan. 14, 2025

(54) SEARCHING FOR IMAGES USING GENERATED IMAGES

(71) Applicant: Adobe Inc., San Jose, CA (US)

(72) Inventors: Saikat Chakrabarty, Noida (IN); Shikhar Garg, New Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/361,822

(22) Filed: Jul. 29, 2023

(51) Int. Cl.
  *G06F 7/00* (2006.01)
  *G06F 16/00* (2019.01)
  *G06F 16/532* (2019.01)
  *G06F 16/538* (2019.01)
  *G06F 16/55* (2019.01)
  *G06F 40/40* (2020.01)

(52) U.S. Cl.
  CPC .......... *G06F 16/538* (2019.01); *G06F 16/532* (2019.01); *G06F 16/55* (2019.01); *G06F 40/40* (2020.01)

(58) Field of Classification Search
  None
  See application file for complete search history.

(56) References Cited

U.S. PATENT DOCUMENTS

| | | | |
|---|---|---|---|
| 2013/0097181 A1* | 4/2013 | Sud | G06F 16/316 707/765 |
| 2015/0169994 A1* | 6/2015 | Chinen | H04N 23/64 382/218 |
| 2021/0191925 A1* | 6/2021 | Sianez | G06N 20/00 |
| 2022/0277056 A1* | 9/2022 | Astrakhantsev | G06F 40/14 |
| 2022/0335256 A1* | 10/2022 | Saraee | G06F 18/214 |

OTHER PUBLICATIONS

Zhang, Richard, "PerceptualSimilarity", GitHub, Inc. Uploaded by richzhang [retrieved May 10, 2023]. Retrieved from the Internet <https://github.com/richzhang/PerceptualSimilarity>., 2018, 8 Pages.

* cited by examiner

*Primary Examiner* — Tuan A Pham
(74) *Attorney, Agent, or Firm* — FIG. 1 Patents

(57) ABSTRACT

In implementations of systems for searching for images using generated images, a computing device implements a search system to receive a natural language search query for digital images included in a digital image repository. The search system generates a set of digital images using a machine learning model based on the natural language search query. The machine learning model is trained on training data to generate digital images based on natural language inputs. The search system performs an image-based search for digital images included in the digital image repository using the set of digital images. An indication of the search result is generated for display in a user interface based on performing the image-based search.

20 Claims, 18 Drawing Sheets

SEARCHING FOR IMAGES USING GENERATED IMAGES

BACKGROUND

Digital image repositories include many digital images (e.g., millions of digital images). These digital images are available (e.g., via a network) to users of the repositories for the users to include in digital content being created or edited by the users. For example, a user editing a digital template that includes an example digital image is capable of replacing the example digital image with digital images included in a digital image repository. In this example, the user searches the digital images included in the digital image repository by performing a natural language search or an image-based search.

The natural language search matches words and phrases of a search input specified by the user with keywords and phrases (e.g., tags) described by metadata of the digital images included in the digital image repository in order to return a list of result digital images. The image-based search matches visual features of an input digital image provided by the user with visual features of the digital images included in the digital image repository in order to return the list of result digital images. For instance, the user selects a particular result digital image from the list and replaces the example digital image in the digital template with the particular result digital image.

SUMMARY

Techniques and systems for searching for images using generated images are described. In an example, a computing device implements a search system to receive a text search query (e.g., a natural language search query) for digital images included in a digital image repository. For instance, the digital image repository includes many digital images (e.g., millions of digital images) such as "stock" photographs, graphic art, photorealistic images, etc. In order to search for digital images included in the digital image repository, the search system generates a set of prompts for a first machine learning model by processing the natural language search query using a second machine learning model.

In one example, the first machine learning model is a generative machine learning model, and the second machine learning model is a natural language model. The first machine learning model generates a set of digital images based on the set of prompts, and the search system performs an image-based search for digital images included in the digital image repository using the set of digital images. The search system receives a search result including result digital images based on performing the image-based search. For example, the search system generates an indication of the search result for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
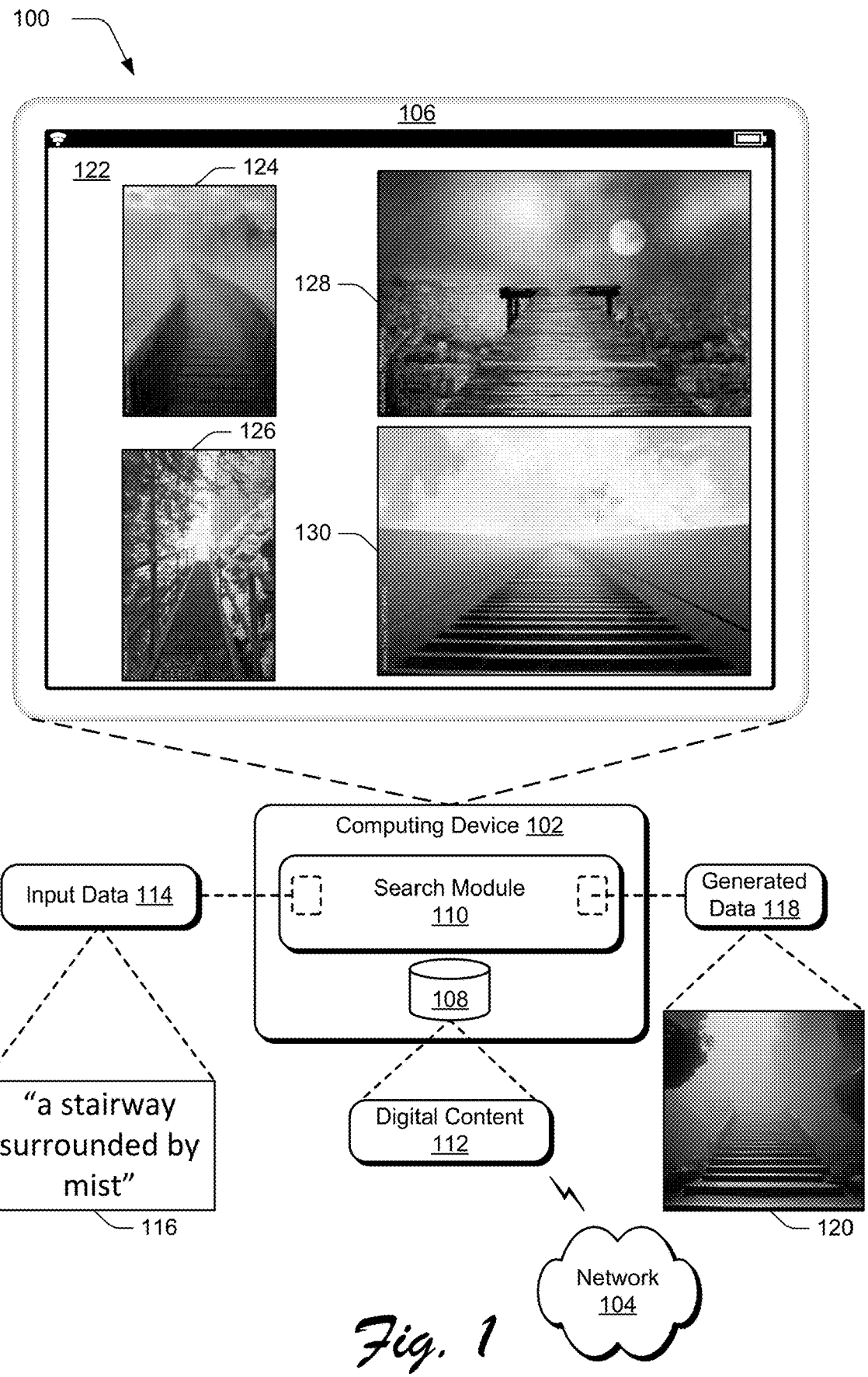
FIG. 1 is an illustration of an environment in an example implementation that is operable to employ digital systems and techniques for searching for images using generated images as described herein.

A digital image repository includes many digital images (e.g., millions of digital images) which are available (e.g., via a network) to a user of the repository for inclusion in digital content being created or edited by the user. In order to search for digital images included the digital image repository (e.g., to use in the digital content), conventional systems are limited to performing natural language searches or image-based searches. The image-based searches require an input digital image in order to search for the digital images which may or may not be available. The natural language searches match words and phrases of a search input specified by the user with keywords and phrases (e.g., tags) described by metadata of the digital images included in the digital image repository. However, the natural language searches often return result digital images which are irrelevant and fail to capture a semantic intent of the search input specified by the user which is a limitation of conventional systems.

In order to overcome this limitation, techniques and systems for searching for images using generated images are described. In an example, a computing device implements a search system to receive a text search query (e.g., a natural language search query) for digital images included in a digital image repository. For example, the search system generates a set of prompts for a first machine learning model by processing the natural language search query using a second machine learning model.

In one example, the second machine learning model is trained on training data to generate prompts for machine learning models based on text queries. In this example, the second machine learning model includes a natural language model such as a bidirectional encoder representations from transformers model. In some examples, the training data used to train the second machine learning model includes examples of training prompts having semantic intents which cause the first machine learning model to generate high-quality digital images that depict visual features which correspond to the semantic intents of the training prompts. Accordingly, in these examples, the second machine learning model learns (e.g., as part of training on the training data) to generate prompts which cause the first machine learning model to generate digital images which depict diverse visual features that correspond to semantic intents of natural language search queries.

In an example, the search system implements the first machine learning model to generate a set of digital images based on the set of prompts. For example, the first machine learning model is trained on training data to generate digital images based on prompts or natural language inputs. In some examples, the first machine learning model is a generative machine learning model such as a diffusion model. The search system performs an image-based search for digital images included in the digital image repository using the set of digital images. For instance, the search system receives a search result based on the image-based search that includes result digital images.

In some examples, the search system groups the result digital images into clusters based on perceptual similarities computed for the result digital images. In these examples, the search system computes the perceptual similarities using a learned perceptual image patch similarity loss. For instance, a first result digital image is perceptually similar to a second result digital image if the first and second result digital images are included in a same one of the clusters. Conversely, the first result digital image is not perceptually similar to the second result digital image if the first and second result digital images are included in different ones of the clusters. The search system generates an indication of the search result for display in a user interface which arranges the result digital images in an order based on the clusters. For example, digital images included in a largest one of the clusters are display first, the order displays result digital images interleaved from the largest one of the clusters and a next largest one of the clusters, etc.

Consider an example in which the search system leverages a characteristic of the digital content being created or edited by the user to determine the order for displaying the result digital images in the user interface. In this example, the search system leverages an aspect ratio of an example digital image included in the digital content and aspect ratios of the result digital images in order to display particular result digital images having aspect ratios similar to the aspect ratio of the example digital image first in the order. In another example, the search system leverages a color distribution of the digital content and color distributions of the result digital images in order to display specific result digital images having color distributions similar to the color distribution of the digital content first in the order.

By leveraging the second machine learning model to generate the set of prompts based on the natural language search input and using the set of digital images generated by the first machine learning model based on the set prompts to perform the image-based search, the search system is capable of displaying result digital images from the digital image repository that depict diverse visual features which correspond to a semantic intent of the natural language search input. This is not possible in conventional systems which are limited to displaying result digital images that are not relevant to the semantic intent of the natural language search input. In addition to reflecting the semantic intent of the natural language search input, result digital images (e.g., from the digital image repository) displayed using the described systems for searching for images using generated images are of a higher quality (e.g., created by a professional) than the generated digital images which include artifacts.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For example, the computing device 102 includes a storage device 108 and a search module 110. Although the search module 110 is illustrated to be included in the computing device 102, it is to be appreciated that, in some examples, the search module 110 is included in a remote computing device such as a virtual computing device which exposes functionality of the search module 110 as a service via the network 104. In one example, some functionality of the search module 110 is exposed as the service via the network 104 while other functionality of the search module 110 is included in modules of the computing device 102. The storage device 108 is illustrated to include digital content 112 such as digital images, digital templates, digital artwork, digital videos, etc.

The search module 110 is illustrated as having, receiving, and/or transmitting input data 114 describing a natural language search input 116 of "a stairway surrounded by mist." For example, a user interacts with an input device (e.g., a mouse, a keyboard, a microphone, a stylus, a touchscreen, etc.) to generate the input data 114 by specifying the natural language search input 116 for digital images included in a digital image repository available via the network 104. In this example, the digital image repository includes millions of digital images such as "stock" photographs, graphic art, illustrations, vector objects, icons, etc.

The digital images included in the digital image repository are "tagged" with keywords and phrases which describe the digital images, e.g., the digital images include metadata describing the keywords and phrases. For example, the keywords and phrases describe objects depicted in the digital images, themes or intents of the digital images, visual features of the digital images (e.g., colors depicted, filters applied, modifications/edits applied, etc.), and so forth. Consider an example in which it is possible to identify particular digital images included in the digital image repository by matching (e.g., semantically matching) words and phrases included in the natural language search input 116 with keywords and phrases described by metadata of the particular digital images.

However, searching for digital images included in the digital image repository by matching terms of the natural language search input 116 with tagged keywords of the digital images produces a search result that only includes nine particular digital images (of the millions of digital images included in the digital image repository) which do not match a semantic intent of the natural language search input 116. For instance, only four of the nine particular digital images depict stairs and only one of the particular digital images depicts mist. In order to generate search results including many digital images that match the semantic intent of the natural language search input 116, the search module 110 receives and processes the input data 114 to generate prompts for a first machine learning model. In an example, the search module 110 generates the prompts for the first machine learning model by processing the natural language search input 116 using a second machine learning model.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, transformers, artificial neural networks (e.g., fully-connected neural networks, deep convolutional neural networks, or recurrent neural networks), deep learning, autoregressive models, etc. By way of example, a machine learning model makes high-level abstractions in data by generating data-driven predictions or decisions from the known input data.

Notably, the first machine learning model and the second machine learning model are included in or available to the search module 110 (e.g., via the network 104. In one example, the second machine learning model is included in the search module 110 and the first machine learning model is included in a remote computing device such as a virtual computing device which is available to the search module 110 via the network 104. In another example, the first machine learning model is included in the search module 110 and the second machine learning model is included in the remote computing device such as the virtual computing device available to the search module 110 via the network 104.

In an example, the second machine learning model is trained on training data to generate prompts for machine learning models based on natural language search inputs. For example, the second machine learning model includes a bidirectional encoder representations from transformers model (e.g., a BERT model). The first machine learning model is a generative machine learning model trained on large amounts of training data to generate digital images based on natural language descriptions of the digital images. In one example, the first machine learning model includes a diffusion model.

Consider an example in which the training data used to train the second machine learning model includes example inputs to the first machine learning model that cause the first machine learning model to generate high quality digital images that correspond to semantic intents of the example inputs. In this example, the second machine learning model learns to generate prompts which cause the first machine learning model to generate digital images that correspond to semantic intents of the prompts as part of training the second machine learning model on the training data. In an example, the search module 110 implements the second machine learning model to process the input data 114 in order to generate a prompt for the first machine learning model such as "stairs leading up to mist at the top of the stairs, shot from below, fog at the top of the stairs."

For instance, the search module 110 then implements the first machine learning model to process the generated prompt in order to generate generated data 118. As shown, the generated data 118 describes a digital image 120 which was generated by the first machine learning model based on the prompt that was generated by the second machine learning model. The digital image 120 depicts a stairway covered in mist which matches the semantic intent of the natural language search input 116.

In some examples, the search module 110 implements the second machine learning model to generate additional prompts based on the search input 116 such as "flight of stairs, photograph, mist around and above the stairs." In these examples, the search module 110 implements the first machine learning model to generate additional digital images based on processing the additional prompts. The search module 110 uses the digital image 120 and the additional digital images to perform image-based searches for digital images included in the digital image repository. In an example, the image-based searches compare visual features of the digital image 120 and visual features of the additional digital images with visual features of the digital images included in the digital image repository in order to return search results.

For example, the search module 110 receives a search result of the image-based search performed using the digital image 120 and search results of the image-based searches performed using the additional digital images. The search results include result digital images, and the search module 110 groups the result digital images into groups or clusters. To do so in one example, the search module 110 generates a latent representation of each of the result digital images and groups the latent representations into the clusters based on perceptual similarities or distances. For example, first and second latent representations corresponding to first and second result digital images are included in a same one of the clusters if the first and second result digital images are perceptually similar and the first and second latent representations are each included in a different one of the clusters if the first and second result digital images are not perceptually similar.

In an example, the search module 110 leverages the clusters in order to generate an indication of a search result for display in a user interface 122 of the display device 106. As shown, the indication includes result digital images 124-130 that are included in the digital image repository and correspond to the semantic intent of the of the natural language search input 116. For instance, result digital image 124 depicts a curved staircase that is shrouded in mist; result digital image 126 depicts a flight of stairs in a misty forest; result digital image 128 depicts a pier of stairs extending over water and below mist or fog; and result digital image 130 depicts a stairway extending up into a distant mist.

In some examples, the search module 110 generates the indication of the search result by arranging the result digital images 124-130 in an order to be displayed in the user interface 122 based on the clusters. In a first example, the search module 110 identifies a cluster of the clusters which includes a greatest number of the latent representations. In the first example, the result digital images 124-130 each have a corresponding latent representation that is included in the identified cluster, and the search module 110 displays additional result digital images having corresponding latent representations in the identified cluster before displaying other result digital images having corresponding latent representations included in other clusters of the clusters.

In a second example, result digital images 124-130 each have a corresponding latent representation that is included in one of the other clusters. In the second example, the result digital image 124 has a first latent representation that is included in a first cluster; the result digital image 126 has a second latent representation that is included in a second cluster; the result digital image 128 has a third latent representation that is included in a third cluster; and the result digital image 130 has a fourth latent representation that is included in a fourth cluster. For example, the search module 110 includes the result digital images 124-130 as part of the indication of the search result because each of the result digital images 124-130 is representative of one of the first, second, third, and fourth clusters.

Consider an example in which the search module 110 generates the indication of the search result by arranging the result digital images 124-130 in an order to be displayed in the user interface 122 based on a characteristic of the digital content 112. For instance, the digital content 112 includes a digital template which the user is editing via interactions with the input device. If the digital template includes an example digital image having a particular aspect ratio, then the search module 110 arranges the result digital images 124-130 first in the order because the result digital images 124-130 also have the particular aspect ratio (or approximately the particular aspect ratio). If the digital template has a particular color distribution, then the search module 110 arranges the result digital images 124-130 first in the order because the result digital images 124-130 also have the particular color distribution (or approximately the particular color distribution).

By leveraging the second machine learning model to generate prompts for the first machine learning model based on the natural language search input 116, and by performing image-based searches of digital images included in the digital image repository using digital images generated by the first machine learning model, the search module 110 is capable of identifying and displaying result digital images that match the semantic intent of the natural language search input 116 such as the result digital images 124-130. This is not possible in conventional systems that are limited to searching for digital images based on keywords and phrases (e.g., tags) described by metadata of the digital images. Conventional systems are also not capable of arranging the result digital images 124-130 in the order based on the characteristic of the digital content 112 which is a further limitation of the conventional systems relative to the described systems for searching for images using generated images.

Figure 2:
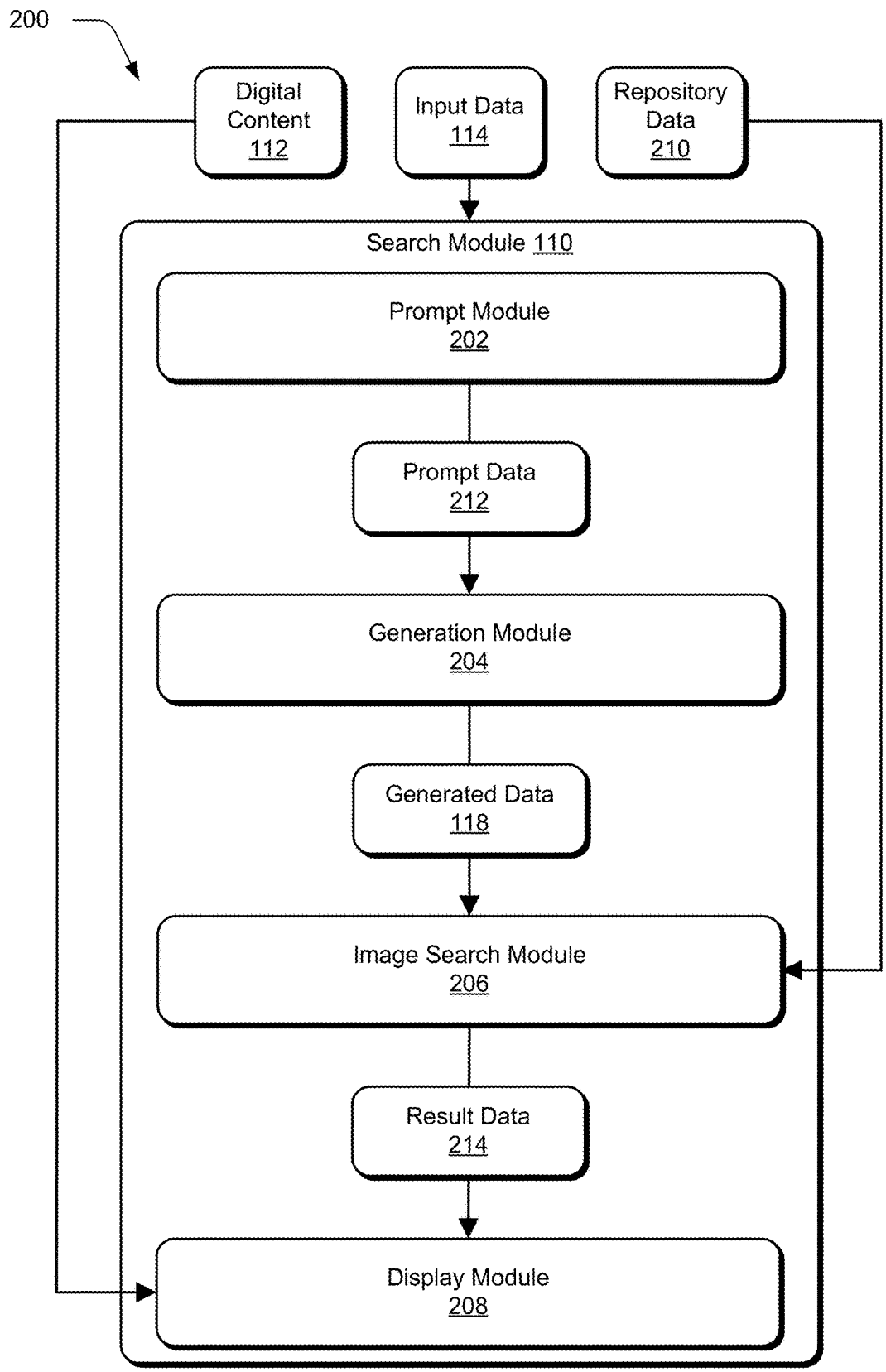
FIG. 2 depicts a system in an example implementation showing operation of a search module for searching for images using generated images.

FIG. 2 depicts a system 200 in an example implementation showing operation of a search module 110. The search module 110 is illustrated to include a prompt module 202, a generation module 204, an image search module 206, and a display module 208. The search module 110 receives the digital content 112 and the input data 114. For example, the search module 110 also receives repository data 210 describing digital images included in a digital image repository. In an example, the prompt module 202 receives and processes the input data 114 in order to generate prompt data 212.

Figure 3:
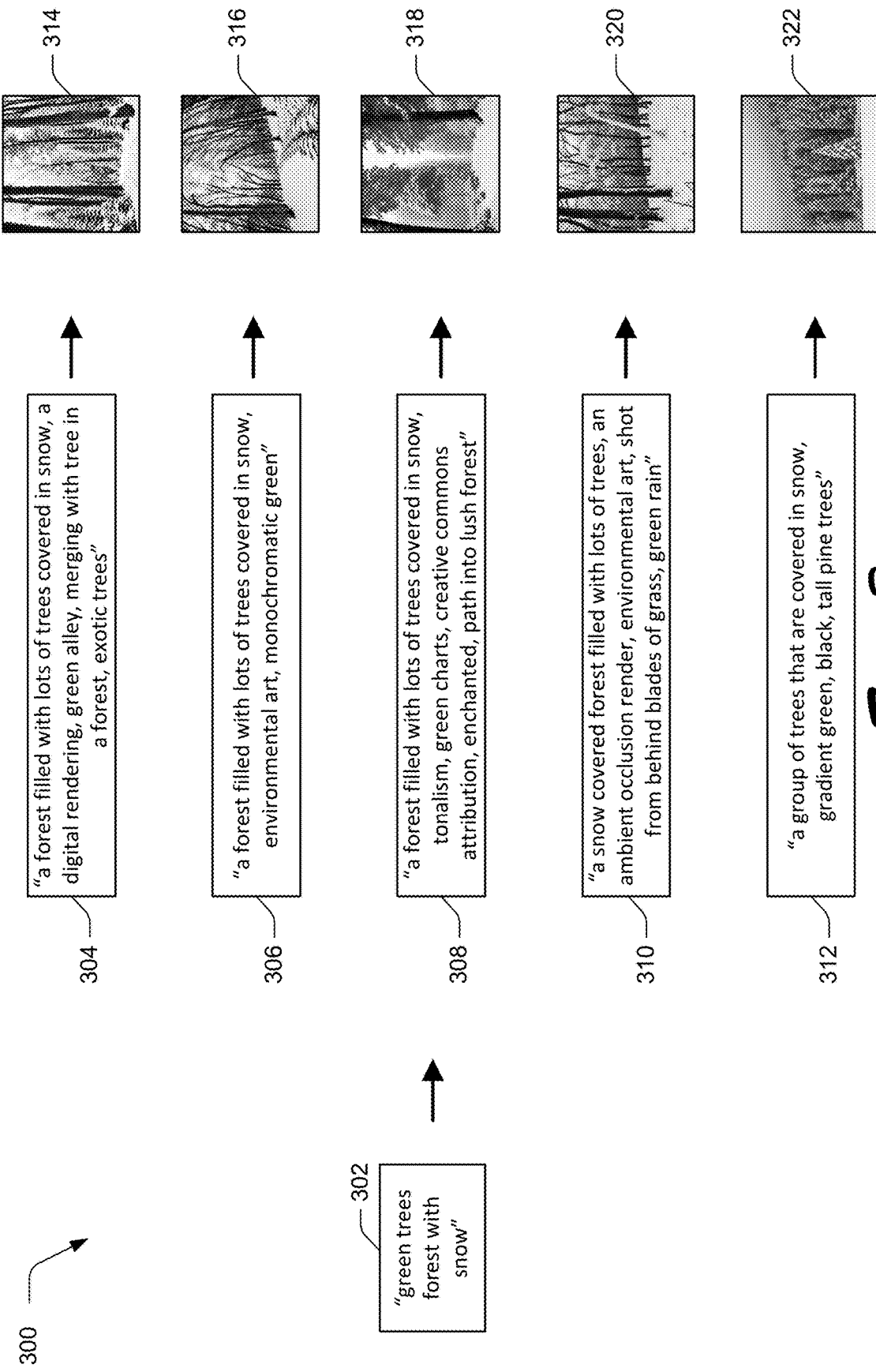
FIG. 3 illustrates a representation of a natural language search input and prompts generated for a machine learning model.

FIG. 3 illustrates a representation 300 of a natural language search input and prompts generated for a machine learning model. The representation 300 includes a natural language search input 302 of "green trees forest with snow." For example, the prompt module 202 receives the input data 114 describing the natural language search input 302. In an example, the prompt module 202 includes or has access to the second machine learning model that is trained on training data to generate prompts for machine learning models based on natural language search inputs. For instance, the second machine learning model is included in the computing device 102 or the second machine learning model is included in a remote computing device that is available to the computing device 102 via the network 104. The second machine learning model includes a BERT model in some examples.

The prompt module 202 implements the second machine learning model to process the input data 114 in order to generate prompts 304-312 for the first machine learning model. In some examples, the prompt module 202 represents the natural language search input 302 as an input query Q (0) and the prompt module 202 represents each of the prompts 304-312 as an output query Q(i) such that a set of the prompts 304-312 is representable as:

$$Q_s = \{Q1, Q2, \ldots, Qn\}$$

where: $Q_s$ denotes a set of prompts generated for the first machine learning model.

In one example, the prompt module 202 generates the prompt data 212 as describing the prompts 304-312. As shown, prompt 304 is "a forest filled with lots of trees covered in snow, a digital rendering, green alley, merging with tree in a forest, exotic trees;" prompt 306 is "a forest filled with lots of trees covered in snow, environmental art, monochromatic green;" prompt 308 is "a forest filled with lots of trees covered in snow, tonalism, green charts, creative commons attribution, enchanted, path into lush forest;" prompt 310 is "a snow covered forest filled with lots of trees, an ambient occlusion render, environment art, shot from behind blades of grass, green rain;" and prompt 312 is "a group of trees that are covered in snow, gradient green, black, tall pine trees."

The generation module 204 receives the prompt data 212 describing the prompts 304-312 for the first machine learning model. In an example, the first machine learning model is included in or available to the generation module 204. In this example, the first machine learning model includes the generative machine learning model trained on training data to generate digital images based on natural language descriptions of the digital images. For example, the first machine learning model is included in the computing device 102 or the first machine learning model is included in a remote computing device that is available to the computing device 102 via the network 104. Examples of generative machine learning models included in the first machine learning model include a diffusion model, a Generative Pre-Trained Transformer 4 model (GPT-4), a Hierarchical Text-Conditional Image Generation with CLIP Latents model (DALL•E 2), etc. In some examples, the first machine learning model includes systems of generative machine learning models.

For instance, the generation module 204 implements the first machine learning model to process the prompt data 212 in order to generate digital images 314-322. In an example, a set of the digital images 314-322 is representable as:

$$G_s = \{G1, G2, \ldots, Gn\}$$

where: $G_s$ denotes a set of digital images generated based on the generated set of prompts $Q_s$.

The generation module 204 generates digital image 314 by processing the prompt 304 using the first machine learning model. Similarly, the generation module 204 implements the first machine learning model to generate digital image 316 based on the prompt 306; digital image 318 based on the prompt 308; digital image 320 based on the prompt 310; and digital image 322 based on the prompt 312.

Figure 4:
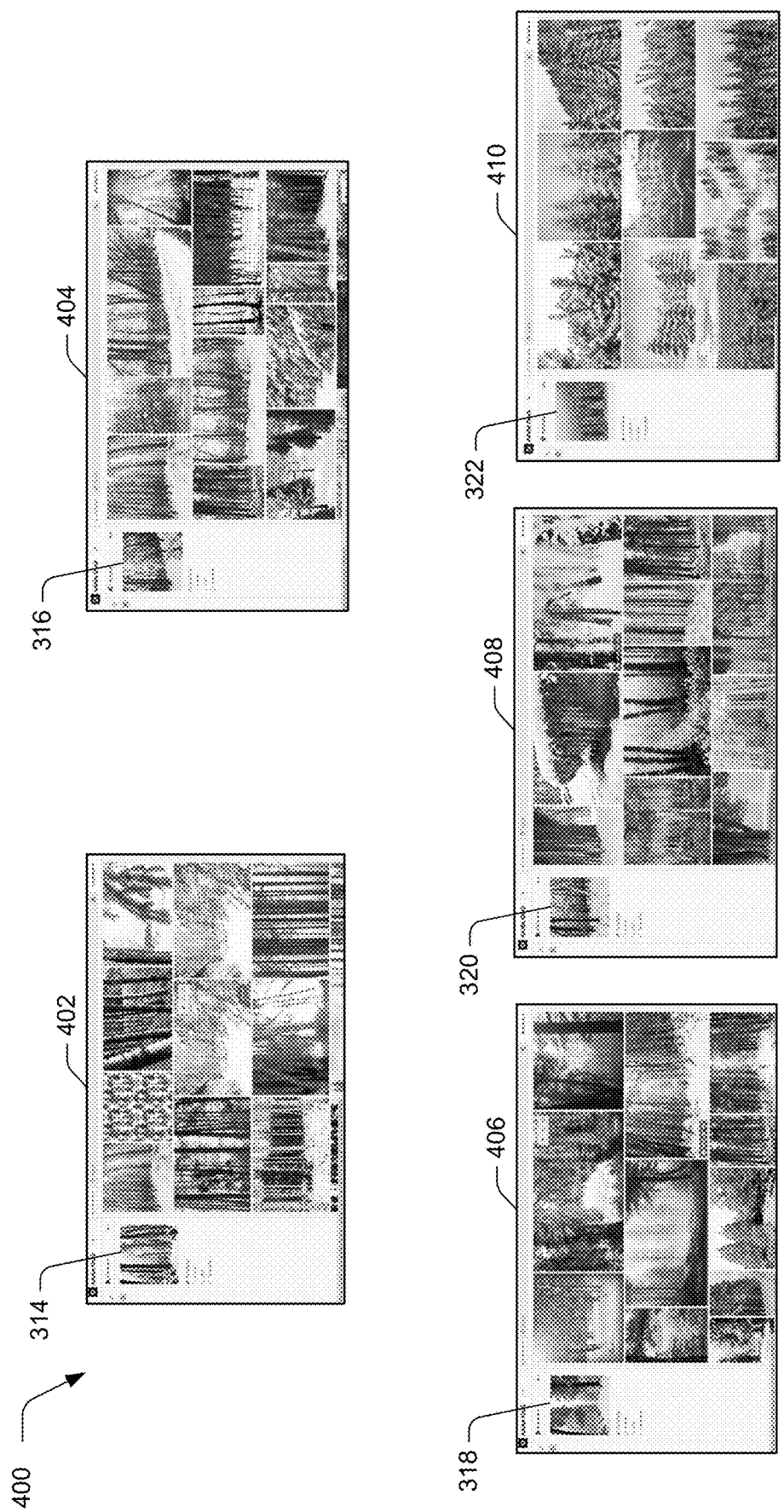
FIG. 4 illustrates a representation of search results based on performing image-based searches for digital images included in a digital image repository.

For example, the generation module 204 generates the generated data 118 as describing the digital images 314-322. In this example, the image search module 206 receives and processes the generated data 118 and the repository data 210 in order to generate result data 214. FIG. 4 illustrates a representation 400 of search results based on performing image-based searches for digital images included in a digital image repository.

As shown in FIG. 4, the representation 400 includes search results 402-410. For instance, the image search module 206 performs image-based searches of digital images included in the digital image repository as described by the repository data 210 using the digital images 314-322 generated by the first machine learning model based on processing the prompts 304-312. In one example, the image search module 206 performs an image-based search of the digital images included in the digital image repository using the digital image 314 in order to identify search result 402 which includes a first set of result digital images.

For example, the image search module 206 identifies search result 404 which includes a second set of result digital images by performing an image-based search of the digital images included in the digital image repository using the digital image 316. Similarly, the image search module 206 identifies search result 406 which includes a third set of result digital images by performing an image-based search of the digital images included in the digital image repository using the digital image 818; the image search module 206 identifies search result 408 which includes a fourth set of result digital images by performing an image-based search of the digital images included in the digital image repository using the digital image 320; and the image search module 206 identifies search result 410 which includes a fifth set of result digital images by performing an image-based search of the digital images included in the digital image repository using the digital image 322. In an example, the image search module 206 generates the result data 214 as describing the search results 402-410.

Figure 5:
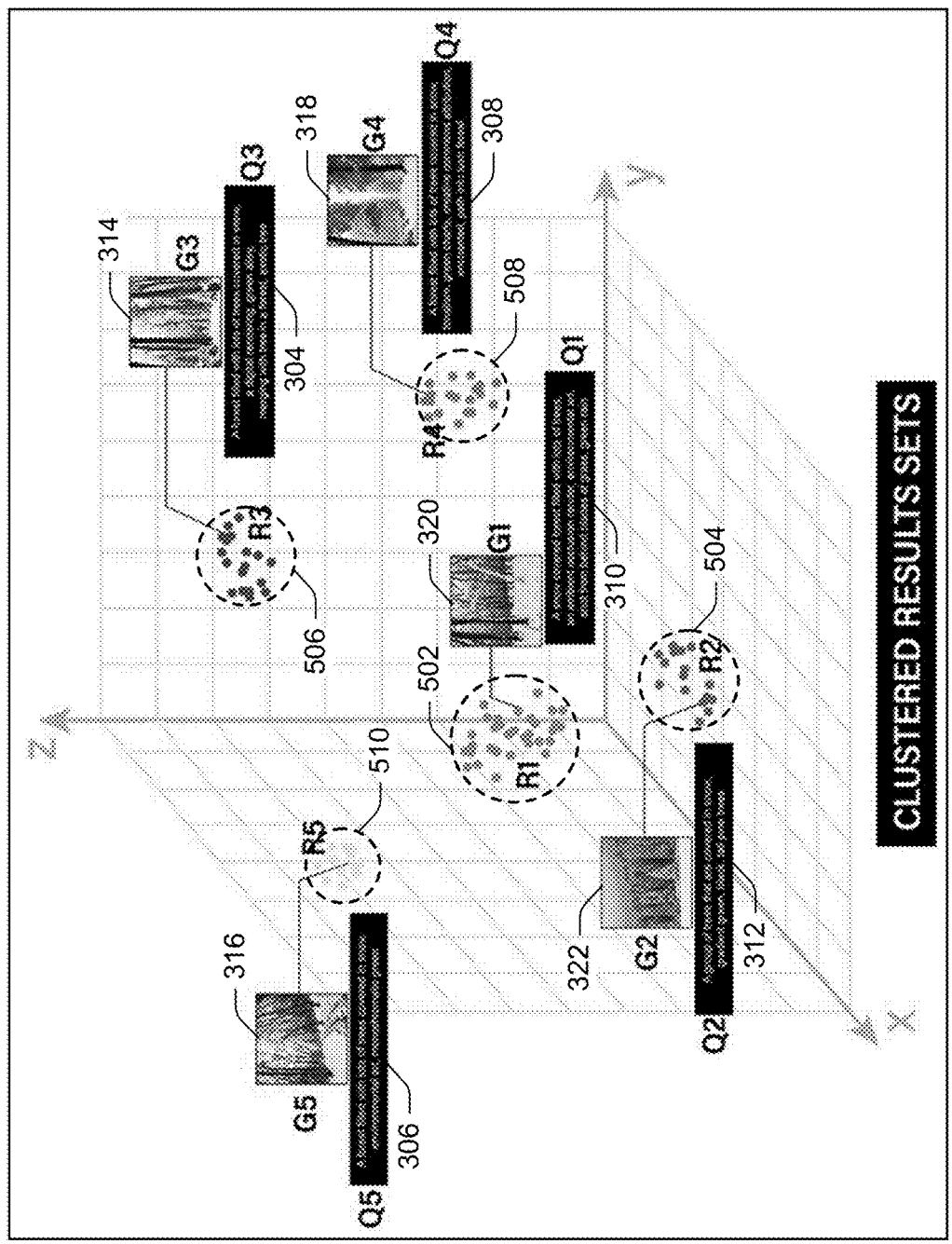
FIG. 5 illustrates a representation of grouping result digital images into clusters.

FIG. 5 illustrates a representation 500 of grouping result digital images into clusters. The display module 208 receives the result data 214 and the digital content 112, and the display module 208 processes the result data 214 in order to group result digital images included in the first, second, third, fourth, and fifth sets of result digital images into clusters 502-510. To do so in one example, the display module 208 generates latent representations (e.g., embeddings) for each of the digital images 314-322, and assigns one of the latent representations of the digital images 314-322 to each of the clusters 502-510. Accordingly, in this example, a number of the clusters 502-510 is equal to a number of the digital images 314-322. However, it is to be appreciated that in other examples, the number of the clusters 502-510 is greater than or less than the number of the digital images 314-322.

For example, the display module 208 generates latent representations (e.g., embeddings) for each of the result digital images included in the first, second, third, fourth, and fifth sets of result digital images, and then groups these latent representations into the clusters 502-510 (e.g., using k-means clustering). In this example, the display module 208 groups the latent representations of the result digital images into the clusters 502-510 based on perceptual similarities computed for the result digital images as described by Zhang et al., The Unreasonable Effectiveness of Deep Features as a Perceptual Metric, arXiv: 1801.03924v2 [cs.CV] (Apr. 10, 2018). In an example, the display module 208 computes the perceptual similarities using a learned perceptual image patch similarity loss.

As shown, cluster 502 includes a greatest number of the result digital images (e.g., a greatest number of latent representations of the result digital images). As further shown, result digital images having latent representations included in the cluster 502 are perceptually similar to the digital image 320. For example, the cluster 502 includes some of the result digital images included in the first, second, third, fourth, and fifth sets of result digital images. In another example, the cluster 502 includes some result digital images included in the fourth set of result digital images from the search result 408 and the cluster 502 also includes some result digital images included in the fifth set of result digital images from the search result 410.

In the illustrated example, cluster 504 includes a second greatest number of the result digital images (e.g., a second greatest number of latent representations of the result digital images). For instance, result digital images having latent representations included in the cluster 504 are perceptually similar to the digital image 322. Cluster 506 includes a third greatest number of the result digital images (e.g., a third greatest number of latent representations of the result digital images) and result digital images having latent representations included in the cluster 506 are perceptually similar to the digital image 314. Cluster 508 includes a fourth greatest number of the result digital images (e.g., a fourth greatest number of latent representations of the result digital images). As shown, result digital images having latent representations included in the cluster 508 are perceptually similar to the digital image 318. Finally, cluster 510 includes a fifth greatest number of the result digital images (e.g., a lowest number of latent representations of the result digital images), and result digital images having latent representations included in the cluster 510 are perceptually similar to the digital image 316.

Consider an example in which the display module 208 leverages the clusters 502-510 and an optional diversity input dn described by the input data 114 to interleave the search results 402-410 for display in the user interface 122. In this example, in response to receiving the input data 114 describing a diversity input dn=1, the display module 208 displays result digital images having latent representations in the cluster 502 (which has the greatest number of latent representations of the result digital images) first and then displays result digital images having latent representations in the cluster 504, the cluster 506, the cluster 508, and the cluster 510. For example, in response to receiving the input data 114 describing a diversity input dn=2, the display module 208 interleaves result digital images having latent representations in the cluster 502 and result digital images having latent representations in the cluster 504 for display in the user interface 122. In a similar example, in response to receiving the input data 114 describing a diversity input dn≤5, the display module 208 interleaves result digital images having latent representations in dn largest ones of the clusters 502-510 for display in the user interface 122 first and then displays result digital images having latent representations in remaining ones of the clusters 502-510 (if any). Although examples are described relative to an example in which a number of the clusters 502-510 is equal to five, it is to be appreciated that the described examples are scalable to any number of clusters.

Figure 6:
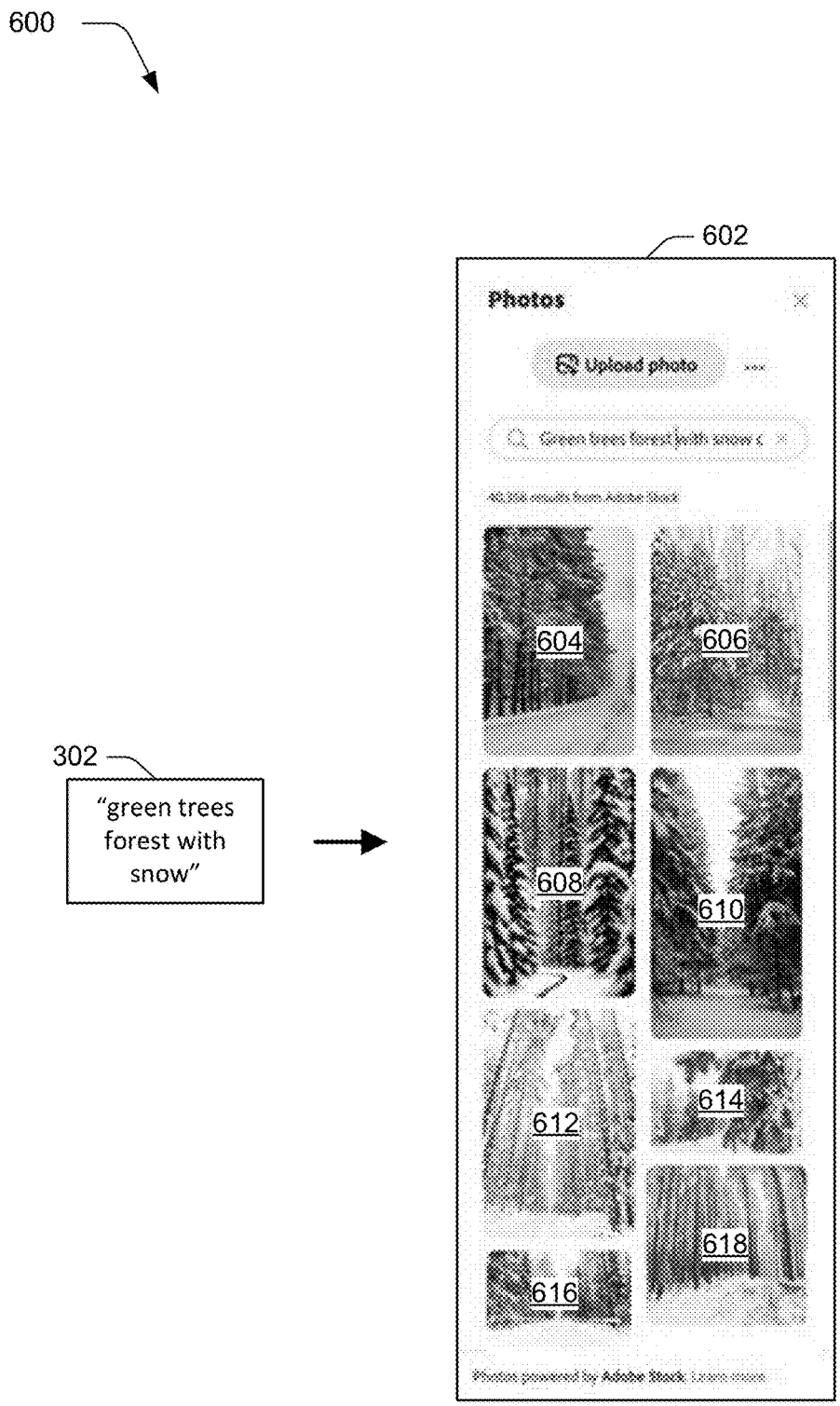
FIG. 6 illustrates a representation of an indication of a search result generated for display in a user interface.

FIG. 6 illustrates a representation 600 of an indication of a search result generated for display in a user interface. For example, the display module 208 generates an indication 602 of a search result based on the natural language search input 302. As shown, the indication 602 includes result digital images 604-618 arranged in an order based on the clusters 502-510 and a diversity input dn. In one example, if the display module 208 receives the input data 114 describing a diversity input dn=1, then the result digital images 604-618 have latent representations included in the cluster 502. In another example, if the display module 208 receives the input data 114 describing a diversity input dn=2, then some of the result digital images 604-618 have latent representations included in the cluster 502 and other ones of the result digital images 604-618 have latent representations included in the cluster 504.

Figure 7A:
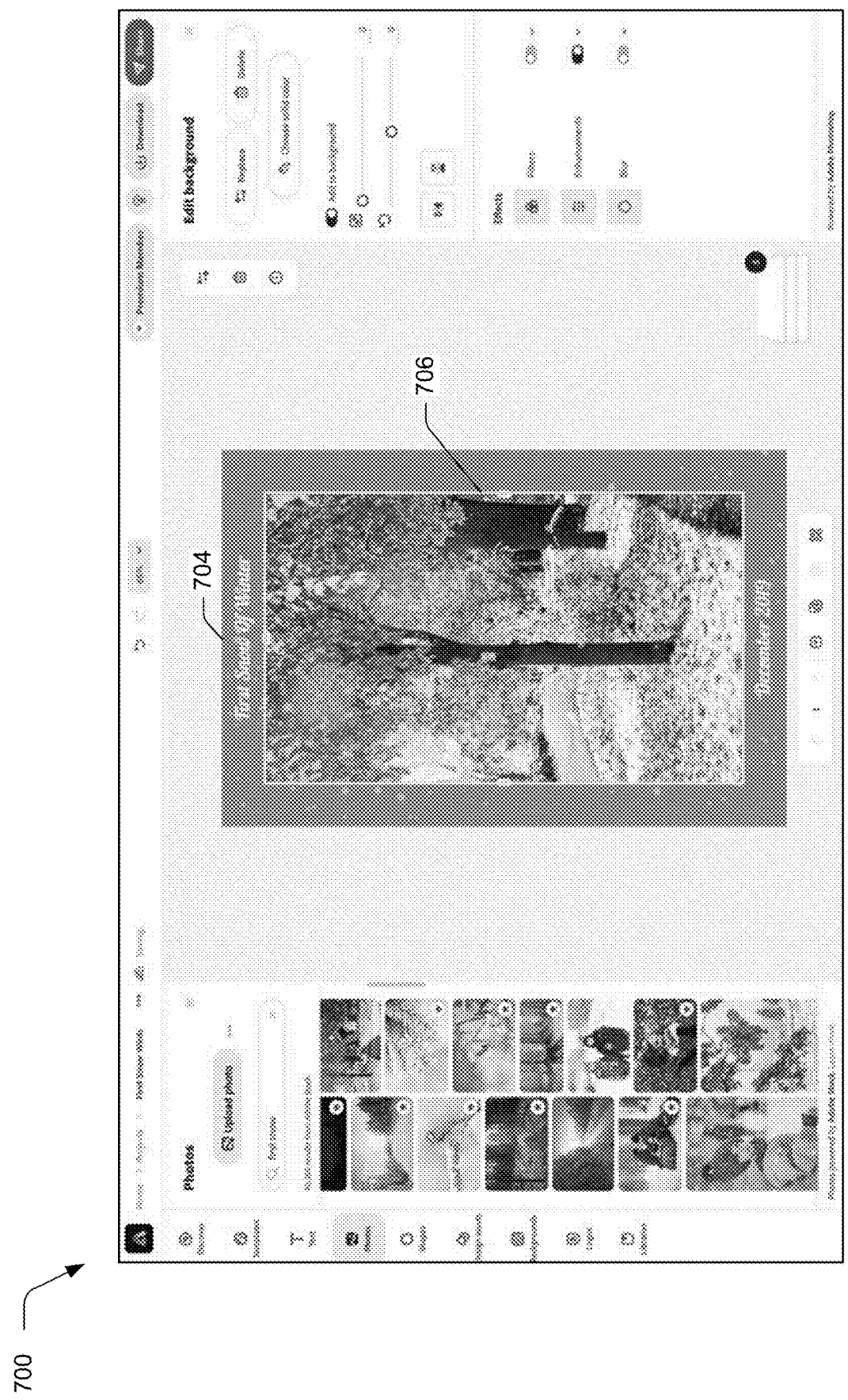
FIGS. 7A and 7B illustrate examples of indications of search results generated based on characteristics of digital content.
Figure 7B:
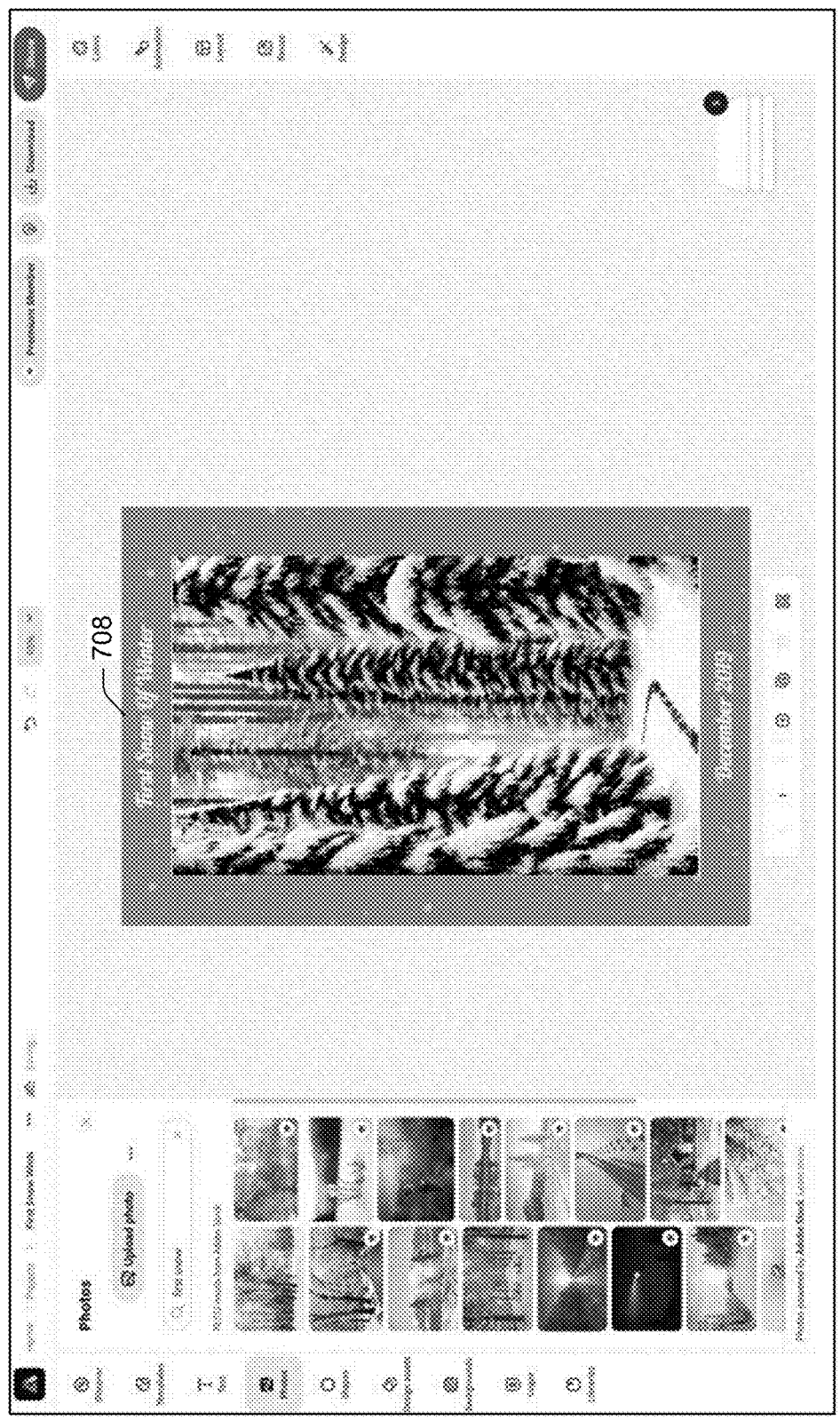

FIGS. 7A and 7B illustrate examples of indications of search results generated based on characteristics of digital content 112. FIG. 7A illustrates a representation 700 of a search result generated based on an aspect ratio of a digital image to be included in digital content 112. FIG. 7B illustrates a representation 702 of a search result generated based on a color distribution of digital content 112.

With reference to FIG. 7A, the display module 208 receives the digital content 112 as including a digital template 704. For example, a user interacts with an input device (e.g., a mouse, a keyboard, a touchscreen, a stylus, etc.) to modify the digital template 704 by searching for digital images included in the digital image repository to replace an example digital image 706 included in the digital template 704. In this example, the display module 208 defines an aspect ratio of the example digital image 706 as $R_{orig}$ and defines an aspect ratio of an output digital image included in a search result as $R_{irsi}$. The display module 208 then computes an aspect ratio penalty as:

$$\text{Aspect Ratio Penalty} = \frac{R_{irsi}}{R_{orig}} \text{ if } R_{irsi} > R_{org} \text{ else} = \frac{R_{orig}}{R_{irsi}}$$

With reference to FIG. 7B, the display module 208 receives the digital content 112 as including a digital template 708. In one example, the display module 208 defines a color distribution of the digital template 708 as $CT_{orig}$ and defines a color distribution of an output digital image included in a search result as $CT_{irsi}$. For example, the display module 208 computes a Color Harmoney Penalty as being equal to an angle of rotation between a primary axis of $CT_{orig}$ and $CT_{irsi}$ in a Hue Saturation Value (HSV) color space.

Consider an example in which the display module 208 computes a Normalized Contextual Penalty as:
Normalized Contextual Penalty $$\text{Normalized Contextual Penalty} = \frac{\alpha * \text{Aspect Ratio Penalty} + \beta * \text{Color Harmony Penalty}}{\alpha + \beta}$$

where: $\alpha=2$ and $\beta=1$ to prioritize aspect ratio over color distribution.

Continuing the above example, the display module 208 computes a final ranking score for ordering result digital images in an indication of a search result as:

$$\text{Final Ranking Score} = \frac{k0}{\epsilon + \text{Normalized Contextual Penalty}}$$

where: k0 is a constant value and $\epsilon$ is a small constant value for numerical stability.

Accordingly, by leveraging the second machine learning model to generate the prompts 304-312 for the first machine learning model based on the natural language search input 302, and by performing image-based searches of digital images included in the digital image repository using the digital images 314-322 generated by the first machine learning model, the search module 110 is capable of identifying and displaying result digital images that match the semantic intent of the natural language search input 302 such as the result digital images 604-618. This is not possible in conventional systems that are limited to searching for digital images based on keywords and phrases (e.g., tags) described by metadata of the digital images. Conventional systems are also not capable of arranging the result digital images 604-618 in the order based on the characteristic of the digital content 112 which is a further limitation of the conventional systems relative to the described systems for searching for images using generated images. Moreover, by displaying the result digital images 604-618 based on the Final Ranking Score, an amount of modification of one of the result digital images 604-618 to replace the example digital image 706 is minimized and ones of the result digital images 604-618 having similar color distributions to the color distribution of the digital template 708 are displayed first in a displayed order of the result digital images 604-618.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 8:
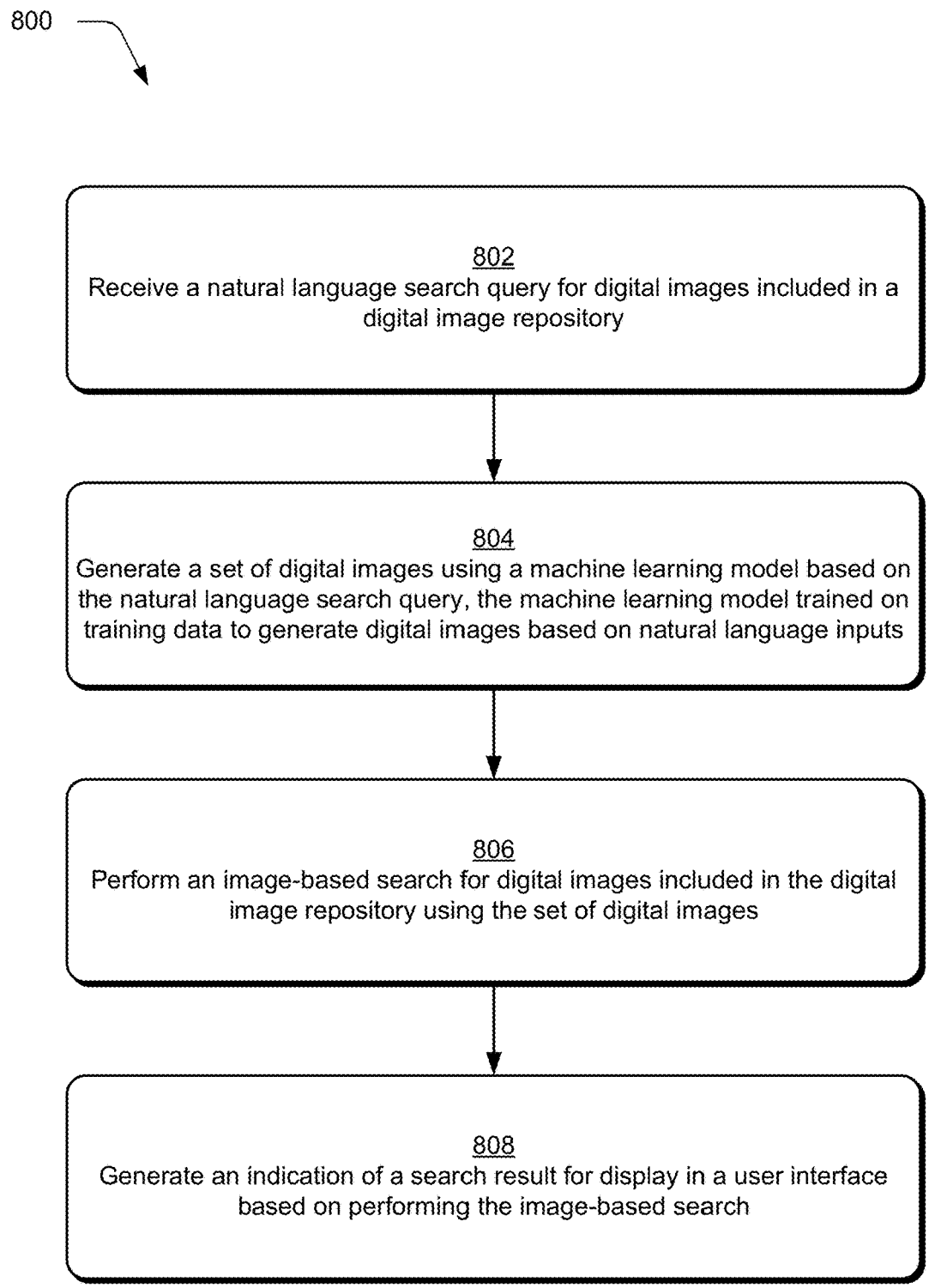
FIG. 8 is a flow diagram depicting a procedure in an example implementation in which a set of digital images is generated using a machine learning model based on a natural language search query.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 8 is a flow diagram depicting a procedure 800 in an example implementation in which a set of digital images is generated using a machine learning model based on a natural language search query.

A natural language search query for digital images included in a digital image repository is received (block 802). For example, the computing device 102 implements the search module 110 to receive the natural language search query. A set of digital images is generated using a machine learning model based on the natural language search query (block 804), the machine learning model is trained on training data to generate digital images based on natural language inputs. In an example, the search module 110 generates the set of digital images using the machine learning model.

An image-based search for digital images included in the digital image repository is performed using the set of digital images (block 806). In one example, the computing device 102 implements the search module 110 to perform the image-based search. An indication of a search result is generated for display in a user interface based on performing the image-based search (block 808). The search module 110 generates the indication of the search result in some examples.

Figure 9:
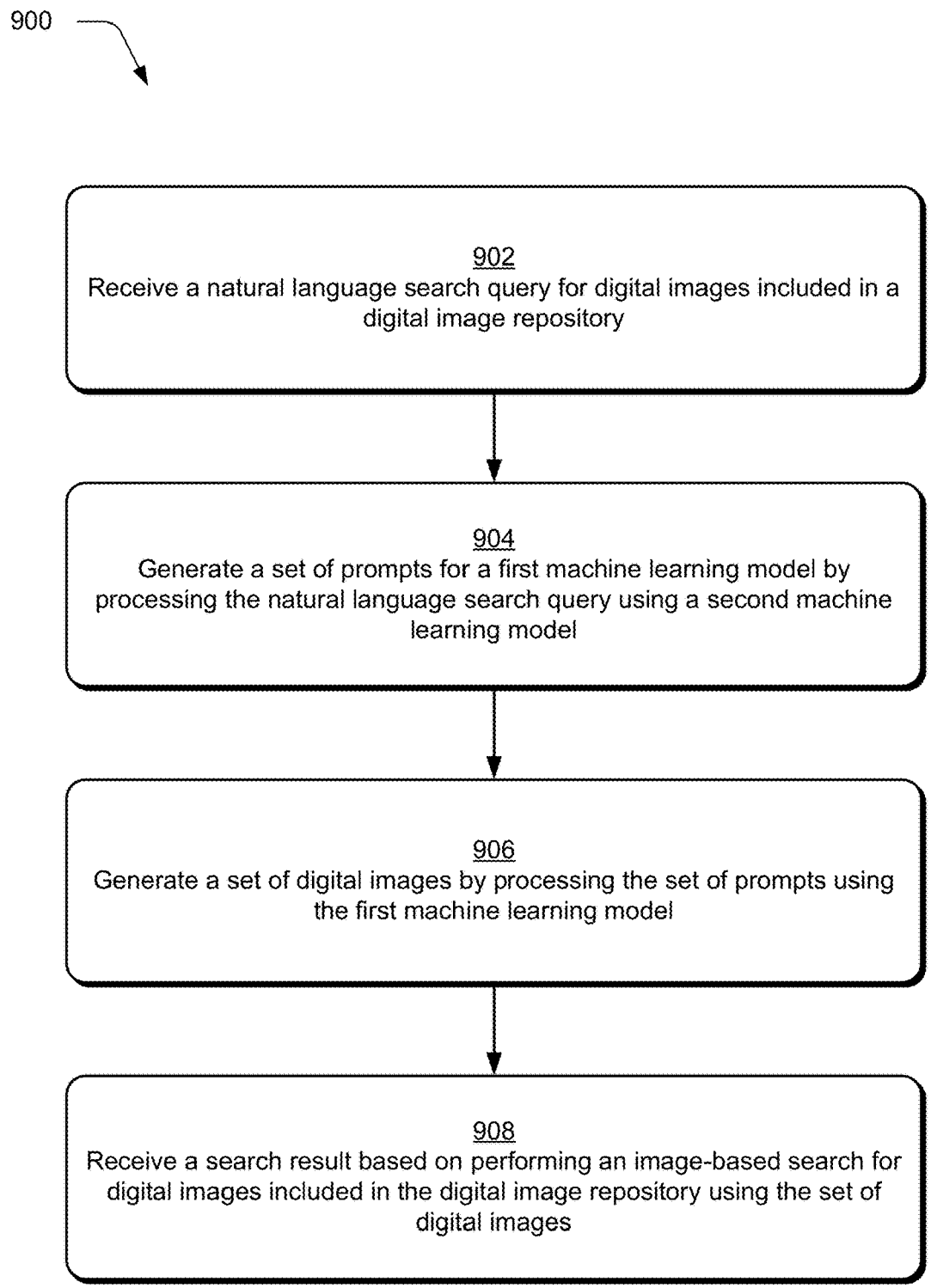
FIG. 9 is a flow diagram depicting a procedure in an example implementation in which a set of prompts for a first machine learning model is generated by processing a natural language search query using a second machine learning model.

FIG. 9 is a flow diagram depicting a procedure 900 in an example implementation in which a set of prompts for a first machine learning model is generated by processing a natural language search query using a second machine learning model. A natural language search query for digital images included in a digital image repository is received (block 902). For example, the search module 110 receives the natural language search query. A set of prompts is generated for a first machine learning model by processing the natural language search query using a second machine learning model (block 904). In some examples, the computing device 102 implements the search module 110 to generate the set of prompts for the first machine learning model.

A set of digital images is generated by processing the set of prompts using the first machine learning model (block 906). In one example, the search module 110 generates the set of digital images by processing the set of prompts using the first machine learning model. A search result is received based on performing an image-based search for digital images included in the digital image repository using the set of digital images (block 908). For example, the search module 110 receives the search result.

Figure 10A:
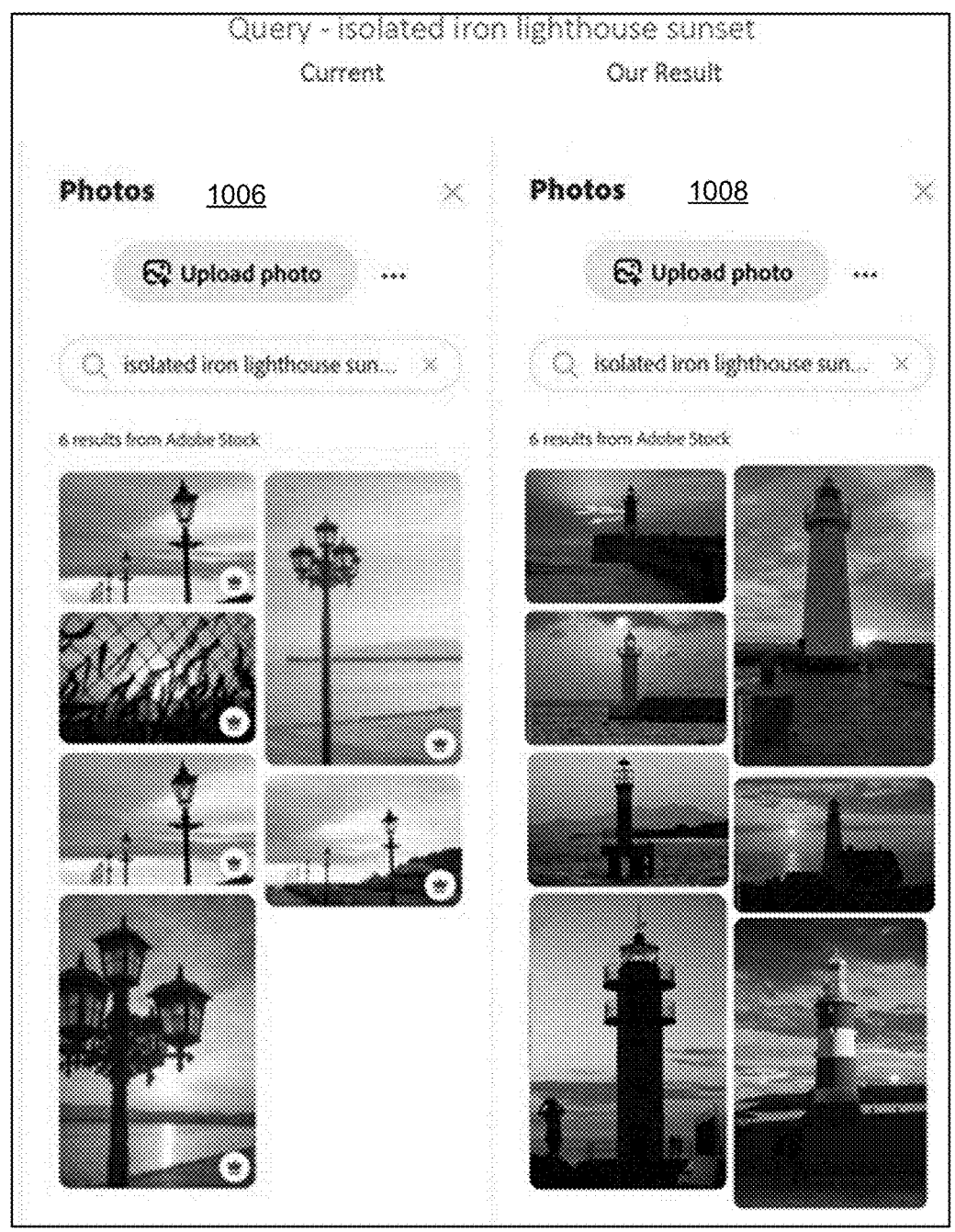
FIGS. 10A, 10B, and 10C illustrate examples of searching for images using generated images.
Figure 10B:
Figure 10C:
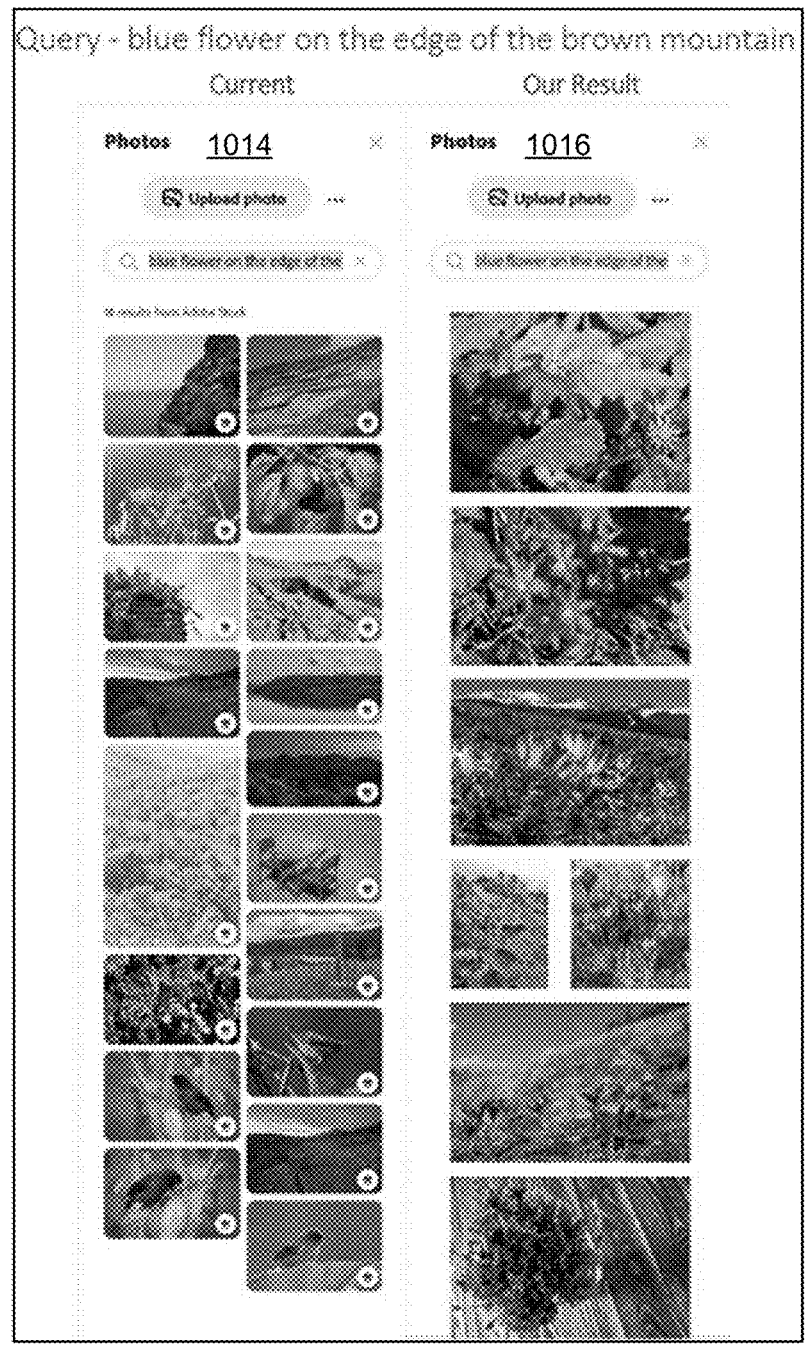

FIGS. 10A, 10B, and 10C illustrate examples of searching for images using generated images. FIG. 10A illustrates a representation 1000 of a first example of result digital images identified based on a first natural language search input. FIG. 10B illustrates a representation 1002 of a second example of result digital images identified based on a second natural language search input. FIG. 10C illustrates a representation 1004 of a third example of result digital images identified based on a third natural language search input.

With reference to FIG. 10A, the representation 1000 includes result digital images 1006 identified by searching the digital images included in the digital image repository using conventional systems as well as result digital images 1008 identified by searching the digital images included in the digital image repository using the described systems for searching for images using generated images based on a natural language search input of "isolated iron lighthouse sunset." The representation 1002 illustrated in FIG. 10B includes result digital images 1010 identified by searching the digital images included in the digital image repository using conventional systems and also result digital images 1012 identified by searching the digital images included in the digital image repository using the described systems for searching for images using generated images based on a natural language search input of "a group of people sitting having dinner under lights." With reference to FIG. 10C, the representation 1004 includes result digital images 1014 identified by searching the digital images included in the digital image repository using conventional systems as well as result digital images 1016 identified by searching the digital images included in the digital image repository using the described systems for searching for images using generated images based on a natural language search input of "blue flower on the edge of the brown mountain."

Figure 11:
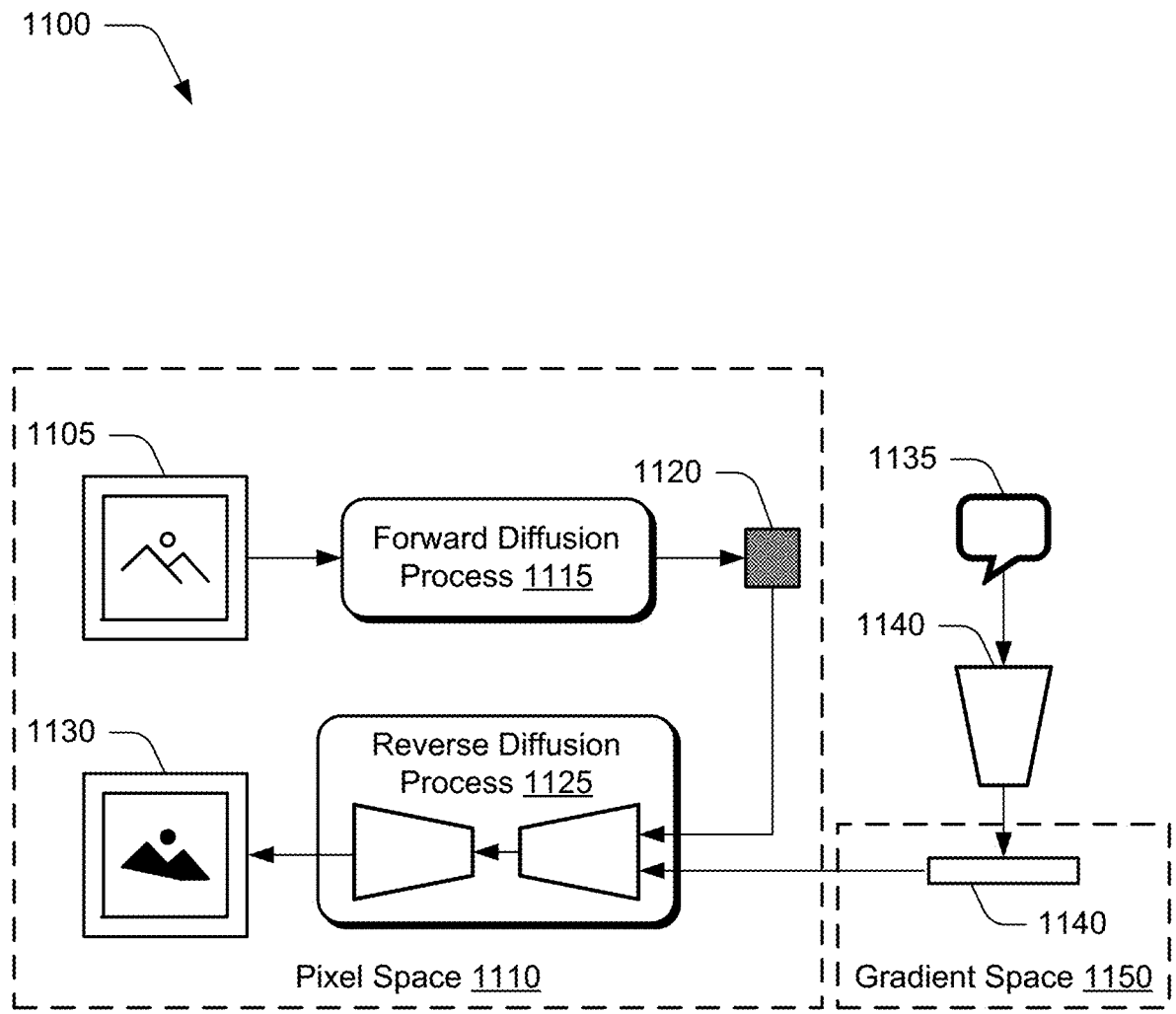
FIG. 11 shows an example of a pixel diffusion model according to implementations of the present disclosure.

FIG. 11 shows an example of a pixel diffusion model 1100 according to implementations of the present disclosure. The example shown includes pixel diffusion model 1100, image 1105, pixel space 1110, forward diffusion process 1115, noisy image 1120, reverse diffusion process 1125, final output image 1130, text prompt 1135, text encoder 1140, guidance features 1145, and guidance space 1150.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include DDPMs and DDIMs. In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, pixel diffusion model 1100 may take an original image 1105 in a pixel space 1110 as input and apply forward diffusion process 1115 to gradually add noise to the original image 1105 to obtain noisy images 1120 at various noise levels.

Next, a reverse diffusion process 1125 (e.g., a U-Net ANN) gradually removes the noise from the noisy images 1120 at the various noise levels to obtain an output image 1130. In some cases, an output image 1130 is created from each of the various noise levels. The output image 1130 can be compared to the original image 1105 to train the reverse diffusion process 1125.

The reverse diffusion process 1125 can also be guided based on a text prompt 1135, or another guidance prompt, such as an image, a layout, a segmentation map, etc. The text prompt 1135 can be encoded using a text encoder 1140 (e.g., a multi-modal encoder) to obtain guidance features 1145 in guidance space 1150. The guidance features 1145 can be combined with the noisy images 1120 at one or more layers of the reverse diffusion process 1125 to ensure that the output image 1130 includes content described by the text prompt 1135. For example, guidance features 1145 can be combined with the noisy features using a cross-attention block within the reverse diffusion process 1125.

In the machine learning field, attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values.

Forward diffusion process 1115 is an example of, or includes aspects of, the corresponding element described with reference to FIG. 14. Noisy image 1120 is an example of, or includes aspects of, the corresponding element described with reference to FIG. 14. Reverse diffusion process 1125 is an example of, or includes aspects of, the corresponding element described with reference to FIG. 14.

Figure 12:
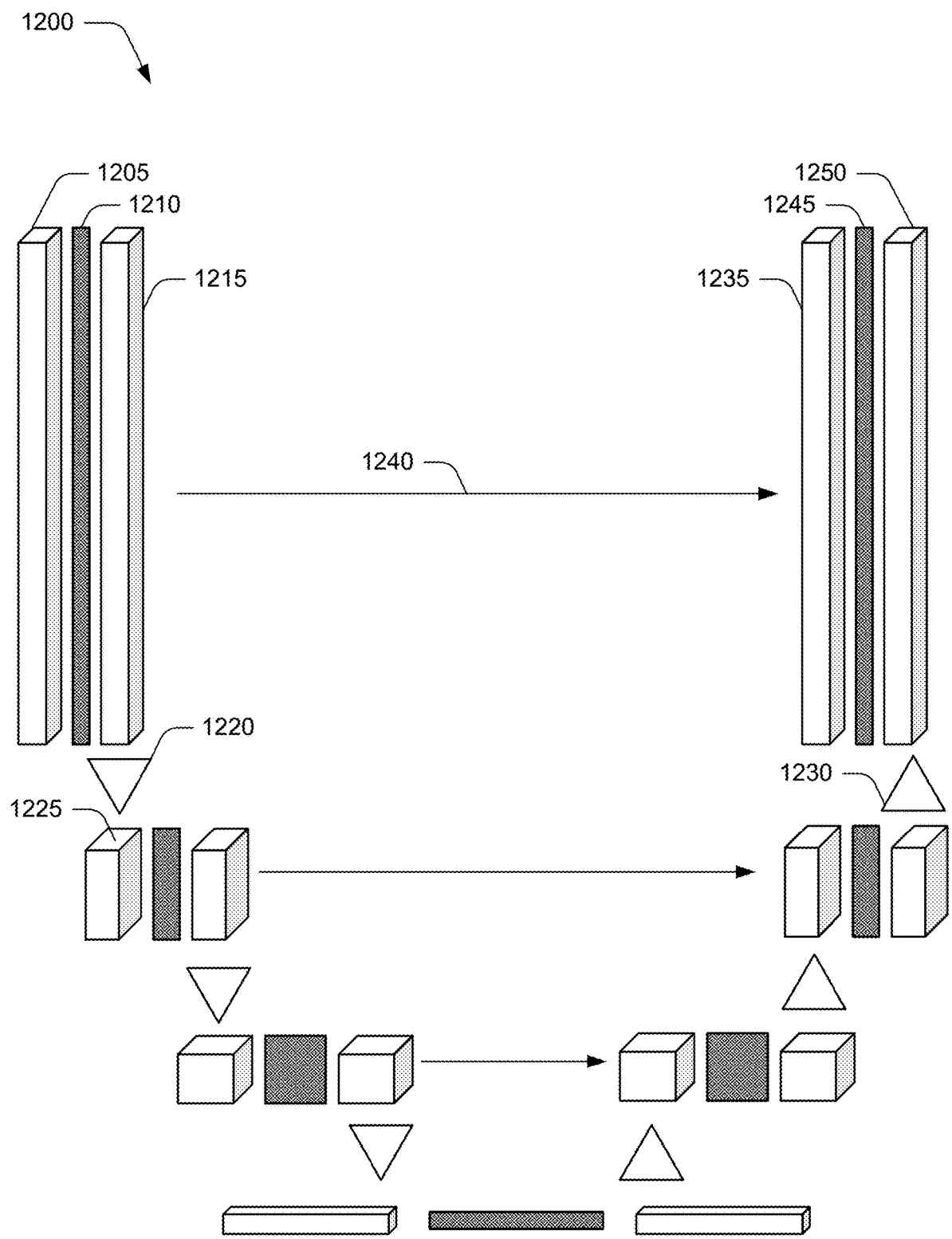
FIG. 12 shows an example of U-net architecture according to implementations of the present disclosure.

FIG. 12 shows an example of U-net 1200 architecture according to implementations of the present disclosure. The example shown includes U-Net 1200, input features 1205, initial neural network layer 1210, intermediate features 1215, down-sampling layer 1220, down-sampled features 1225, up-sampling layer 1230, up-sampled features 1235, skip connection 1240, final neural network layer 1245, and output features 1250. The U-Net 1200 depicted in FIG. 12 is an example of, or includes aspects of, the architecture used within the reverse diffusion process described with reference to FIG. 11.

In some examples, diffusion models are based on a neural network architecture known as a U-Net. The U-Net 1200 takes input features 1205 having an initial resolution and an initial number of channels and processes the input features 1205 using an initial neural network layer 1210 (e.g., a convolutional network layer) to produce intermediate features 1215. The intermediate features 1215 are then down-sampled using a down-sampling layer 1220 such that down-sampled features 1225 features have a resolution less than the initial resolution and a number of channels greater than the initial number of channels.

This process is repeated multiple times, and then the process is reversed. That is, the down-sampled features 1225 are up-sampled using up-sampling process 1230 to obtain up-sampled features 1235. The up-sampled features 1235 can be combined with intermediate features 1215 having a same resolution and number of channels via a skip connection 1240. These inputs are processed using a final neural network layer 1245 to produce output features 1250. In some cases, the output features 1250 have the same resolution as the initial resolution and the same number of channels as the initial number of channels.

In some cases, U-Net 1200 takes additional input features to produce conditionally generated output. For example, the additional input features could include a vector representation of an input prompt. The additional input features can be combined with the intermediate features 1215 within the neural network at one or more layers. For example, a cross-attention module can be used to combine the additional input features and the intermediate features 1215.

Figure 13:
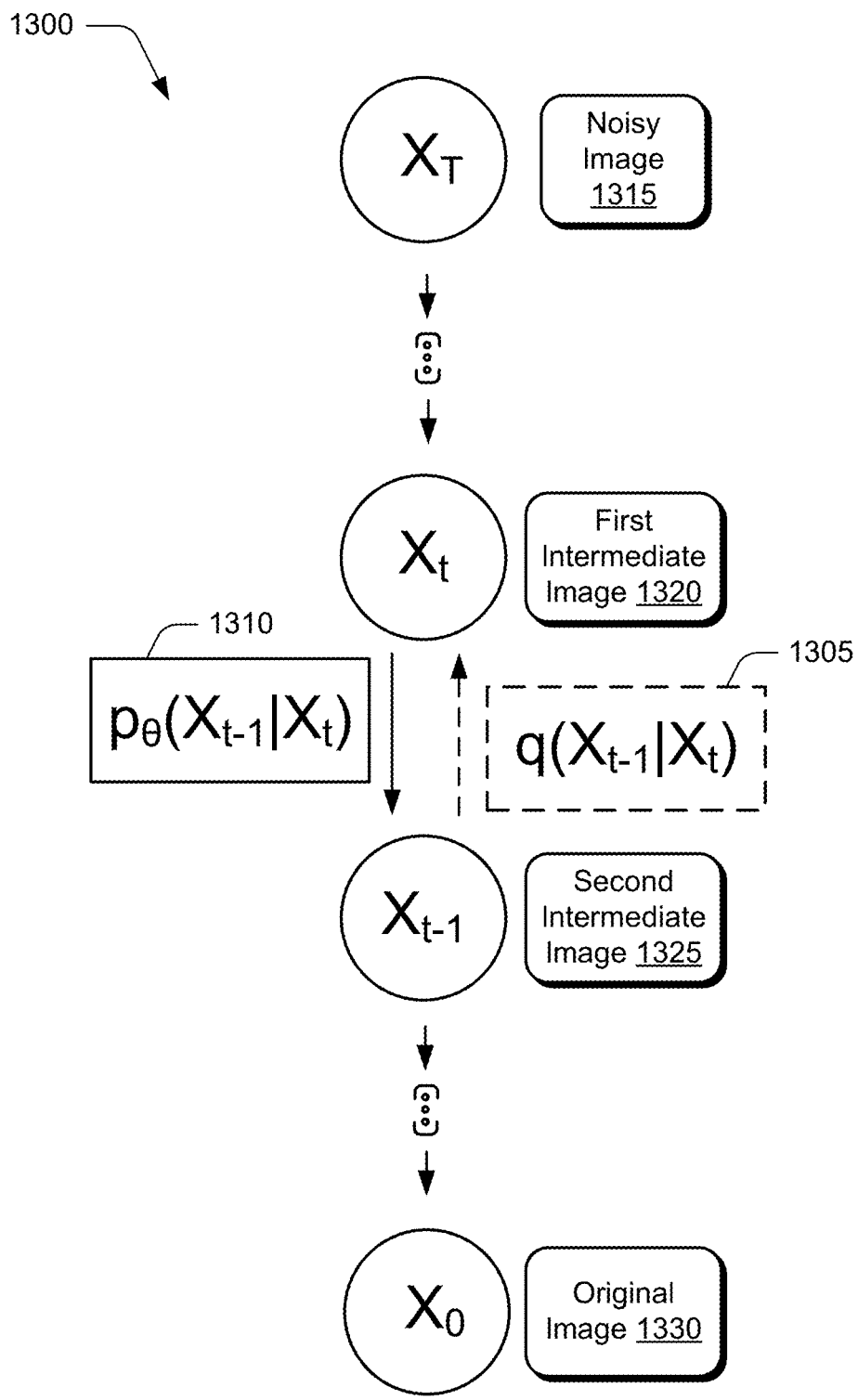
FIG. 13 shows an example of reverse diffusion according to implementations of the present disclosure.

FIG. 13 shows an example of reverse diffusion according to implementations of the present disclosure. The example shown includes diffusion process 1300, forward diffusion process 1305, reverse diffusion process 1310, noisy image 1315, first intermediate image 1320, second intermediate image 1325, and original image 1330. Forward diffusion process 1305 is an example of, or includes aspects of, the corresponding element described with reference to FIG. 11. Reverse diffusion process 1310 is an example of, or includes aspects of, the corresponding element described with reference to FIG. 11. Noisy image 1315 is an example of, or includes aspects of, the corresponding element described with reference to FIG. 11.

As described above with reference to FIG. 11, a diffusion model includes a forward diffusion process 1305 for adding noise to an image (or features in a latent space) and a reverse diffusion process 1310 for denoising the images (or features) to obtain a denoised image. The forward diffusion process 1305 can be represented as $q(x_t|x_{t-1})$, and the reverse diffusion process 1310 can be represented as $p(x_{t-1}|x_t)$. In some cases, the forward diffusion process 1305 is used during training to generate images with successively greater noise, and a neural network is trained to perform the reverse diffusion process 1310 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 1310, the model begins with noisy data $x_T$, such as a noisy image 1315 and denoises the data to obtain the $p(x_{t-1}|x_t)$. At each step $t-1$, the reverse diffusion process 1310 takes $x_t$, such as first intermediate image 1320, and t as input. Here, t represents a step in the sequence of transitions associated with different noise levels, The reverse diffusion process 1310 outputs $x_{t-1}$, such as second intermediate image 1125 iteratively until $x_T$ is reverted back to $x_0$, the original image 1130. The reverse process can be represented as:

$$p_\theta(x_{t-1}|x_t):=N(x_{t-1};\mu_\theta(x_t,t),\tau_\theta(x_t,t). \tag{1}$$

The joint probability of a sequence of samples in the Markov chain can be written as a product of conditionals and the marginal probability:

$$x_T : p_\theta(x_{0:T}) := p(x_T) \prod_{t=1}^{T} p_\theta(x_{t-1}|x_t), \tag{2}$$

where $p(x_t)=N(x_T; 0, I)$ is the pure noise distribution as the reverse process takes the outcome of the forward process, a sample of pure noise, as input and $\Pi_{t=1}^T p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Figure 14:
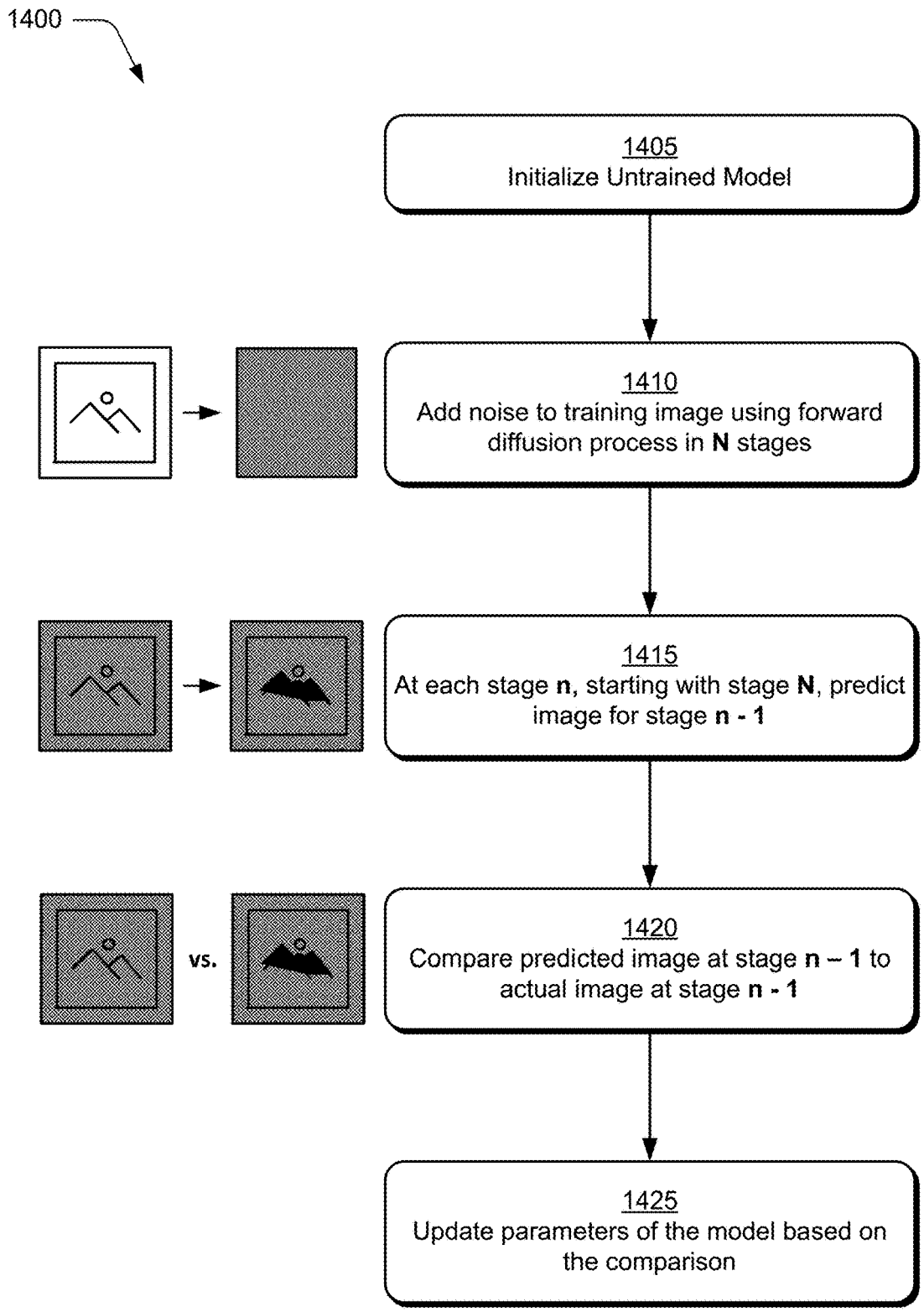
FIG. 14 shows an example of a method for training a diffusion model according to implementations of the present disclosure.

FIG. 14 shows an example of a procedure 1400 for training a diffusion model according to embodiments of the present disclosure. The procedure 1400 represents an example for training a reverse diffusion process as described above with reference to FIG. 13.

Additionally or alternatively, certain processes of procedure 1400 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1410, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1415, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image.

At operation 1420, the system compares predicted image (or image features) at stage n−1 to an actual image (or image features), such as the image at stage n−1 or the original input image. For example, given observed data x, the diffusion model may be trained to minimize the variational upper bound of the negative log-likelihood −log $p_\theta(x)$ of the training data.

At operation 1425, the system updates parameters of the model based on the comparison. For example, parameters of a U-Net may be updated using gradient descent. Time-dependent parameters of the Gaussian transitions can also be learned.

Example System and Device

Figure 15:
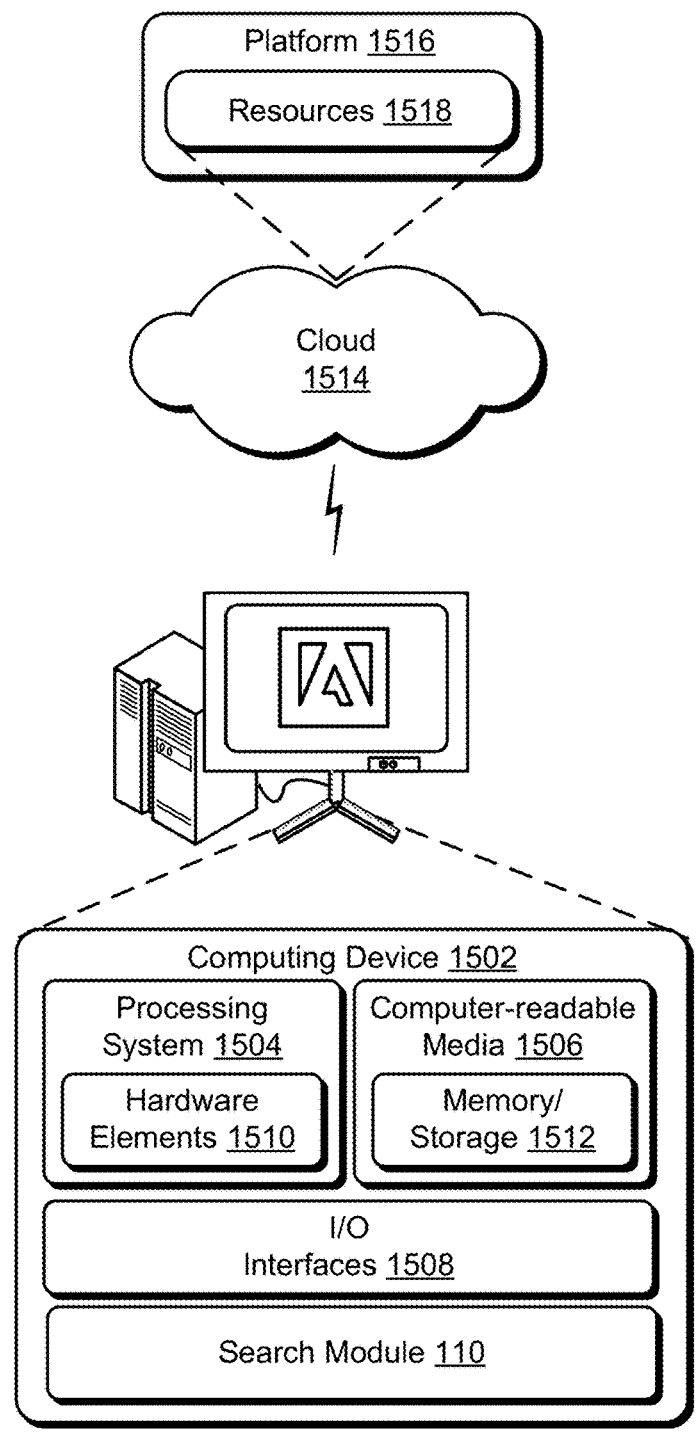
FIG. 15 illustrates an example system that includes an example computing device that is representative of one or more computing systems and/or devices for implementing the various techniques described herein.

FIG. 15 illustrates an example system 1500 that includes an example computing device that is representative of one or more computing systems and/or devices that are usable to implement the various techniques described herein. This is illustrated through inclusion of the search module 150. The computing device 1502 includes, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interfaces 1508 that are communicatively coupled, one to another. Although not shown, the computing device 1502 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware elements 1510 that are configured as processors, functional blocks, and so forth. This includes example implementations in hardware as an application specific integrated circuit or other logic device formed using one or more semiconductors. The hardware elements 1510 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1506 is illustrated as including memory/storage 1512. The memory/storage 1512 represents memory/storage capacity associated with one or more computer-readable media. In one example, the memory/storage 1512 includes volatile media (such as random access memory (RAM)) and/or nonvolatile media (such as read only memory (ROM), Flash memory, optical disks, magnetic disks, and so forth). In another example, the memory/storage 1512 includes fixed media (e.g., RAM, ROM, a fixed hard drive, and so on) as well as removable media (e.g., Flash memory, a removable hard drive, an optical disc, and so forth). The computer-readable media 1506 is configurable in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1502. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1502, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that is employable in some implementations to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1510. For example, the computing device 1502 is configured to implement particular instructions and/or functions corresponding to the software and/or hardware modules. Accordingly, implementation of a module that is executable by the computing device 1502 as software is achieved at least partially in hardware, e.g., through use of computer-readable storage media and/or hardware elements 1510 of the processing system 1504. The instructions and/or functions are executable/operable by one or more articles of manufacture (for example, one or more computing devices 1502 and/or processing systems 1504) to implement techniques, modules, and examples described herein.

The techniques described herein are supportable by various configurations of the computing device 1502 and are not limited to the specific examples of the techniques described herein. This functionality is also implementable entirely or partially through use of a distributed system, such as over a "cloud" 1514 as described below.

The cloud 1514 includes and/or is representative of a platform 1516 for resources 1518. The platform 1516 abstracts underlying functionality of hardware (e.g., servers) and software resources of the cloud 1514. For example, the resources 1518 include applications and/or data that are utilized while computer processing is executed on servers that are remote from the computing device 1502. In some examples, the resources 1518 also include services provided over the Internet and/or through a subscriber network, such as a cellular or Wi-Fi network.

The platform 1516 abstracts the resources 1518 and functions to connect the computing device 1502 with other computing devices. In some examples, the platform 1516 also serves to abstract scaling of resources to provide a corresponding level of scale to encountered demand for the resources that are implemented via the platform. Accordingly, in an interconnected device implementation, implementation of functionality described herein is distributable throughout the system 1500. For example, the functionality is implementable in part on the computing device 1502 as well as via the platform 1516 that abstracts the functionality of the cloud 1514.

What is claimed is:

1. A method comprising:
    receiving, by a processing device, a text search query to locate at least one digital image included in a digital image repository, the text search query being in a natural language format;
    generating, by the processing device, a set of prompts using a first machine learning model by processing the text search query, the first machine learning model including a natural language model and being trained to generate prompts that cause a second machine learning model to generate digital images that depict visual features that correspond to semantic intents of text search queries in the natural language format, the first machine-learning model including a bidirectional encoder representations from transformers model:
    generating, by the processing device, a generated digital image with first visual features using the second machine learning model based on the set of prompts, the second machine learning model trained on training data to generate generated digital images with visual features that correspond to semantic intents of training text inputs in the natural language format;
    performing, by the processing device and using the generated digital image as an input, an image-based search to locate the at least one digital image included in the digital image repository by comparing second visual features of the at least one digital image to the first visual features of the generated digital image;

presenting, by the processing device, a search result of the at least one digital image in a user interface based on the performing of the image-based search.

2. The method as described in claim 1, wherein the search result arranges digital images in an order based on clusters.

3. The method as described in claim 2, wherein the digital images are grouped into the clusters based on perceptual similarities computed for the digital images.

4. The method as described in claim 3, wherein the perceptual similarities are computed using a learned perceptual image patch similarity loss.

5. The method as described in claim 2, wherein the order is based on a cluster of the clusters that includes a greatest number of the digital images.

6. The method as described in claim 1, wherein digital images included in the search result are arranged in an order based on aspect ratios.

7. The method as described in claim 1, wherein digital images included in the search result are arranged in an order based on color distributions.

8. A system comprising:
a memory component; and
a processing device coupled to the memory component, the processing device to perform operations comprising:
receiving a natural language search query for at least one digital image included in a digital image repository;
generating a set of prompts for a first machine learning model by processing the natural language search query using a second machine learning model, the second machine learning model including a natural language model and trained to generate prompts that cause the first machine learning model to generate digital images that depict visual features that correspond to semantic intents of natural language search queries, the second machine-learning model including a bidirectional encoder representations from transformers model;
generating a generated digital image by processing the set of prompts using the first machine learning model using generative artificial intelligence (AI) that includes first visual features, the first machine learning model trained to generate generated digital images with visual features that correspond to the semantic intents of prompts; and
presenting a search result of an image-based search performed in the digital image repository using the generated digital image as an input, the search result including at least one digital image with second visual features similar to the first visual features.

9. The system as described in claim 8, wherein digital images included in the search result are grouped into clusters and an indication of the search result is generated for display in a user interface by arranging the digital images in an order based on the clusters.

10. The system as described in claim 9, wherein the digital images are grouped into the clusters based on perceptual similarities computed for the result digital images.

11. The system as described in claim 10, wherein the perceptual similarities are computed using a learned perceptual image patch similarity loss.

12. The system as described in claim 9, wherein the order is based on a cluster of the clusters that includes a greatest number of the digital images.

13. The system as described in claim 8, wherein the operations further comprise arranging digital images included in the search result in an order based on at least one of aspect ratios of the digital images or color distributions of the digital images.

14. A non-transitory computer-readable storage medium storing executable instructions, which when executed by a processing device, cause the processing device to perform operations comprising:
receiving a text search query for digital images included in a digital image repository, the text search query being in a natural language format;
generating a set of prompts using a first machine learning model by processing the text search query, the first machine learning model including a natural language model and being trained to generate prompts that cause a second machine learning model to generate digital images that depict visual features that correspond to semantic intents of text search queries in the natural language format, the first machine-learning model including a bidirectional encoder representations from transformers model;
generating a set of digital images that includes first visual features using the second machine learning model based on the set of prompts, the second machine learning model trained on training data to generate generated digital images with visual features that correspond to semantic intents of text inputs in the natural language format;
receiving a search result based on performing an image-based search for digital images included in the digital image repository by comparing second visual features of the digital images to the first visual features of the set of digital images; and
presenting the search result for display in a user interface.

15. The non-transitory computer-readable storage medium as described in claim 14, wherein digital images included in the search result are grouped into clusters.

16. The non-transitory computer-readable storage medium as described in claim 15, wherein the digital images are grouped into the clusters based on perceptual similarities computed for the digital images.

17. The non-transitory computer-readable storage medium as described in claim 16, wherein the perceptual similarities are computed using a learned perceptual image patch similarity loss.

18. The non-transitory computer-readable storage medium as described in claim 15, wherein an order of the clusters is based on a cluster of the clusters that includes a greatest number of the digital images.

19. The non-transitory computer-readable storage medium as described in claim 14, wherein the search result arranges digital images based on aspect ratios.

20. The non-transitory computer-readable storage medium as described in claim 14, wherein the search result arranges digital images based on color distributions.

* * * * *